United States Patent
Ramanathan et al.

(10) Patent No.: US 7,562,098 B2
(45) Date of Patent: Jul. 14, 2009

(54) OPPORTUNISTIC DIRECTORY CACHE

(75) Inventors: Venkataraman Ramanathan, Sammamish, WA (US); Ramanathan Ganapathy, Redmond, WA (US); Yun Lin, Kirkland, WA (US); David Kruse, Kirkland, WA (US)

(73) Assignee: Microsoft Corporation, Redmond, WA (US)

(*) Notice: Subject to any disclaimer, the term of this patent is extended or adjusted under 35 U.S.C. 154(b) by 351 days.

(21) Appl. No.: 11/204,626

(22) Filed: Aug. 16, 2005

(65) Prior Publication Data

US 2006/0041633 A1  Feb. 23, 2006

Related U.S. Application Data

(62) Division of application No. 10/081,673, filed on Feb. 22, 2002, now Pat. No. 7,065,558.

(51) Int. Cl.
*G06F 17/30* (2006.01)
(52) U.S. Cl. ............... 707/104.1; 707/100; 707/101
(58) Field of Classification Search ............... 707/2, 707/4, 9, 10, 104, 100, 104.1; 711/3, 121, 711/122, 128, 144; 709/217, 219, 203
See application file for complete search history.

(56) References Cited

U.S. PATENT DOCUMENTS

| | | | | |
|---|---|---|---|---|
| 5,864,852 A | * | 1/1999 | Luotonen | 707/104.1 |
| 5,944,780 A | * | 8/1999 | Chase et al. | 709/201 |
| 6,041,324 A | * | 3/2000 | Earl et al. | 707/9 |
| 6,073,129 A | * | 6/2000 | Levine et al. | 707/4 |
| 6,119,153 A | * | 9/2000 | Dujari et al. | 709/218 |
| 6,353,871 B1 | * | 3/2002 | Benveniste et al. | 711/3 |
| 6,587,923 B1 | * | 7/2003 | Benveniste et al. | 711/122 |
| 2005/0160226 A1 | * | 7/2005 | Averill et al. | 711/133 |

* cited by examiner

*Primary Examiner*—Cam-Linh Nguyen
(74) *Attorney, Agent, or Firm*—Marshall, Gerstein & Borun LLP (57) ABSTRACT

An opportunistic directory cache and method of usage reduce the number of calls between a client and server for file information, reducing the wastage of network resources and server resources. The expirable directory cache can be refreshed any time an appropriate directory enumeration call is made to the server, and is capable of being partially rather than completely invalidated in response to an indication that the file information of a file listed in the cache has or will change. If the affected file is identifiable, the entry in the cache for that file is invalidated, i.e. it is no longer useful for serving file information. If the affected file is not identifiable, then a first character projection of the file name is invalidated in the cache. In this manner, the directory cache is maintained with minimum resources and is persisted to the greatest extent possible, increasing its likelihood of usefulness.

10 Claims, 8 Drawing Sheets

| CHARACTER INVALIDATION FIELD 330 | NUMBER OF INVALID-ATIONS FIELD 332 |
|---|---|
| FILE NAME | FILE ATTRIBUTES |
| SAMPLE.TXT | [SAMPLE.TXT BDI INFO] |
| PROG.EXE | [PROG.EXE BDI INFO] |
| ⋮ | ⋮ |
| SAMPLE2.TXT | [SAMPLE2.TXT BDI INFO] |

| | | |
|---|---|---|
| USER ID FIELD 334 | 340 | 350 |
| CHARACTER INVALIDATION FIELD | NUMBER OF INVALID-ATIONS FIELD | |
| FILE NAME | FILE ATTRIBUTES | |
| SAMPLE.TXT | [SAMPLE.TXT BDI INFO] | 528 |
| PROG.EXE | [PROG.EXE BDI INFO] | |
| ⋮ | ⋮ | |
| SAMPLE2.TXT | [SAMPLE2.TXT BDI INFO] | |
| 341 | 351 | |

OPPORTUNISTIC DIRECTORY CACHE

This is a divisional of U.S. application Ser. No. 10/081,673, filed Feb. 22, 2002, the entire disclosure of which is incorporated herein by reference.

TECHNICAL FIELD

This invention relates generally to the technology of computer networking and, more particularly, relates to a caching mechanism for minimizing network traffic due to frequent server calls.

BACKGROUND OF THE INVENTION

In a computer network environment, a computer user can retrieve information from a local source, such as a local disk drive, or from a remote source such as a file on a remote server. While the user may locally store the files that the user wishes to interact with, it is common to store other files on a server. For example, where numerous users using different computers may need to sequentially access and read or modify a single file, such as in a collaborative workplace, such a file is typically located on a server that is accessible to the various multiple users.

Because a user, or the user's computer, most likely does not have precise and timely information regarding the contents of a particular directory, the user's computer typically requests that the directory be enumerated so that the computer may determine what is and is not stored in the directory of interest. For example, an "open" operation directed to a file in the directory will succeed only if the particular file exists in the specified directory.

There are many other situations where an application on a computer may make one or more calls to the server for directory information. For example, some applications trigger open or query-directory calls after each letter of a file name is entered. Thus, when the file name "cabbage" is typed into such an application for opening, seven separate open or query calls are sent to the server. The first is sent when the first "c" is typed in, the second when the first "a" is typed in and so forth with "b," "b," "a," "g," and "e."

Excessive querying of the server for directory and/or file information wastes both communication medium bandwidth and server bandwidth. This in turn either decreases the speed with which networked machines are served or decreases the number of machines serviceable by the server. Accordingly, there is a need for a system that minimizes the number of calls to a server for such information, in order to save the resources of both the server and the communication medium.

SUMMARY OF THE INVENTION

The system described herein provides an opportunistic directory cache that enables certain requests for information to be served from the cache rather than requiring a call to the server. The directory cache is such that it can be used negatively or positively, and for directory enumeration. In particular, in the negative mode, the cache is used to determine that a given file does not exist in the relevant directory on the server. In positive mode, the directory cache is utilized to 1) determine that a given file does exist in the relevant directory on the server, and 2) serve FILE-BASIC-INFORMATION (attributes) for the given file. Finally, for purposes of enumeration, the directory cache can be used to provide a listing of the directory contents.

The directory cache is an expirable cache that is not updated during its lifetime. A long lifetime leads to an increase in the usability of the directory cache, i.e. it is long-lived and so obviates a greater number of calls to the server. At the same time, the accuracy of the directory cache is generally inversely related to the lifetime of the cache. A moderate lifetime provides a directory cache that is reasonably accurate and that provides a reasonable efficiency in obviating calls to the server. The level of activity in the network and with respect to the directory of interest is one factor to consider in setting the directory cache lifetimes, with less active environments allowing for longer lifetimes. In an embodiment, the directory cache is partially rather than completely invalidated in response to certain events subsequent to caching. In this way, the useful life of the directory cache is extended, improving the efficient use of both channel bandwidth and server resources. The partial invalidation consists of either an express invalidation of an identified cache entry or the invalidation of a first character projection in the cache.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention is primarily for use in a networked environment in an embodiment and may further be practiced in distributed computing environments where tasks are performed by remote processing devices that are linked through a communications network. In a distributed computing environment, program modules may be located in both local and remote memory storage devices.

Figure 1:
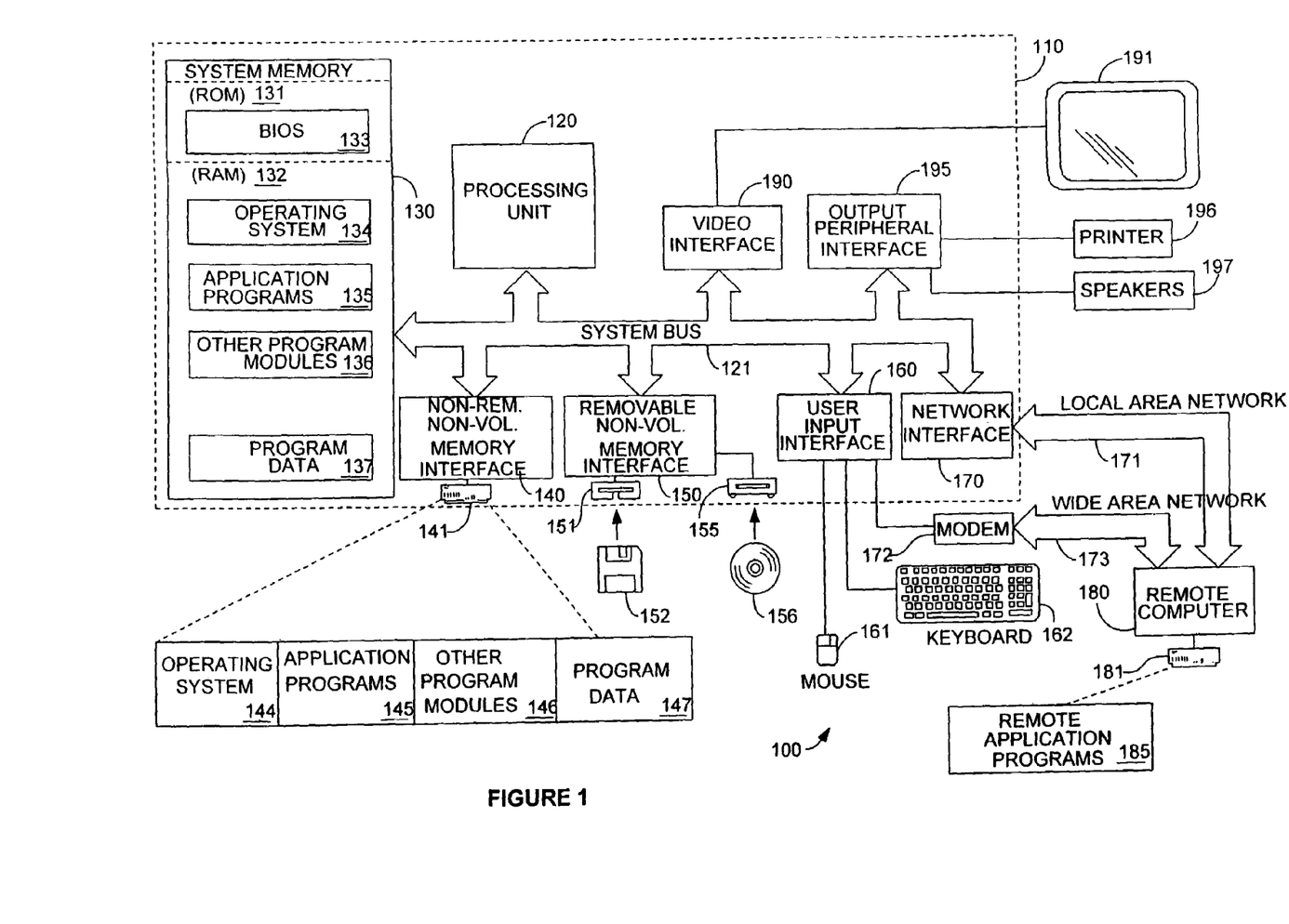
FIG. 1 is a block diagram generally illustrating an exemplary computer system usable in an implementation of the present invention.

FIG. 1 illustrates an example of a: suitable computing system environment 100 usable in an implementation of the invention. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that are suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

As indicated above, the invention is described in the general context of computer-executable instructions, such as program modules, being executed by a computer. Generally, program modules include routines, programs, objects, components, data structures, etc. that perform particular tasks or implement particular abstract data types.

An exemplary system for implementing the invention includes a general purpose computing device in the form of a computer 110. Components of the computer 110 generally include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example only, and not limitation, computer readable media may comprise computer storage media and communication media.

Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110.

Communication media typically embodies computer readable instructions, data structures, program modules or other data in a modulated data signal such as a carrier wave or other transport mechanism and includes any information delivery media. The term "modulated data signal" means a signal that has one or more of its characteristics (such as, for example, voltage or current level, voltage or current pulse existence or nonexistence, voltage or current pulse width, voltage or current pulse spacing, etc.) set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM; and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to, the monitor, computers may also include other peripheral output devices such as speakers 197 and printer 196, which may be connected through an output peripheral interface 195.

When used to implement an embodiment of the invention, the computer 110 generally operates in a networked environment using logical connections to one or more remote computers, such as a remote computer 180. One remote computer 180 will typically be a server in an implementation of an embodiment of the invention, but there may additionally or alternatively exist another remote computer that is a personal computer, a router, a network PC, a peer device or other common network node, and in any case the remote computer or computers typically include many or all of the elements described above relative to the personal computer 110, although only a memory storage device 181 has been illustrated in FIG. 1. The logical connections depicted in FIG. 1 include a local area network (LAN) 171 and a wide area network (WAN) 173, but the computer 110 may additionally or alternatively use one or more other networking environments. Networking environments of all types are commonplace in offices, enterprise-wide computer networks, intranets and the Internet.

The computer 110 preferably includes facilities for accessing the networks to which it is attachable. For example, when used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. It is not intended to limit the invention to use in a hard-wired network environment, since it may also be used in transiently connected environments, such as for example a wholly or partially wireless network environment interconnected wholly or partially via optical, infrared, and/or radio frequency wireless connections.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
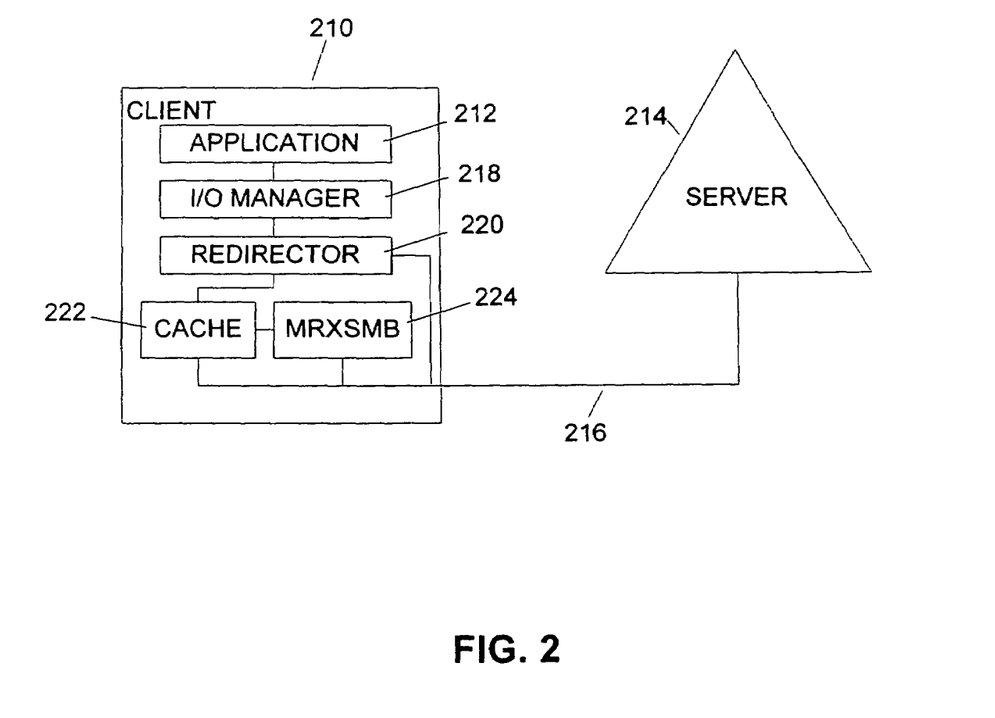
FIG. 2 is a schematic diagram showing the architecture of a network computing system within which an embodiment of the invention can be implemented.

FIG. 2 illustrates schematically a networking environment in which the present invention can be implemented. The client computer 210 is preferably as described above with respect to computer 110. For example, the client 210 preferably comprises a processor and at least one form of volatile memory, referred to with respect to FIG. 1 as RAM 132. The client computer 210 further comprises a loaded application 212 and is networked with server 214 via network connection 216. Although the networking hardware and interface is not explicitly illustrated for simplicity, it will be understood that client computer 210 and server 214 both have sufficient facilities to access the network connection 216. Network connection 216 may be any type of medium, wired or otherwise, having single or multiple wires or channels, that is capable of passing information between the client 210 and server 214, such as the network connections 171, 173 illustrated in FIG. 1.

The client computer 210 further comprises an input/output manager (I/O manager) 218 usable by the application 212 to execute requests for obtaining or outputting information. The I/O manager 218 in turn utilizes a redirector 220 when it suspects that the information is not local (e.g. files in the UNC format, as \\Server\Share\Dir\File). The redirector 220 is responsible for obtaining requested information, whether locally (in the case where the Redirector determines that \\Server\Share is only pointing to the local machine's file system), or remotely such as from server 214 or other networked machine. The redirector 220 thus maintains information regarding where and how to obtain requested information. The information maintained by the redirector 220 with respect to location indicates what data source hosts a particular set of information, such as a directory, share, etc. The redirector 220 further comprises a connection engine, which is a portion of RDBSS.SYS in the context of the WINDOWS platform produced by MICROSOFT CORPORATION of Redmond, Wash., as well as a number of "mini-Redirectors" (or "mini-rdr"), each adapted to communicate via one of a number of different protocols. For the discussion that follows, it will be assumed that the mini-rdr utilized communicates via the server message block ("SMB") protocol, although such is not required.

The cache 222 is used to temporarily store information for faster access than could be had by returning to the original source of the information, as will be discussed in greater detail below. The structure of the cache 222 is shown in greater detail in the schematic diagram of FIG. 3a. In particular, the cache 322 further comprises a "FileNotFound" cache 324, a "FileInfo" cache 326, and a directory cache 328. The usage of the FileNotFound cache 324 and the FileInfo cache 326 is familiar to those of skill in the art. In particular, the FileNotFound cache 324 is an expirable cache with a lifetime of perhaps 7 seconds. The information cached in the FileNotfound cache 324 is used to obviate a call to a server or other source for information regarding a file that is already described by the cache as not existing on the source or has been deleted or renamed by a process in the client (and about which the client, therefore, has first-hand information). The FileInfo cache 326 is similarly an expirable cache with a lifetime of perhaps 7 seconds. The information cached in the FileInfo cache 326 is used to obviate a call to the server for information regarding a file when the requested information is already contained in the cache 326.

Figure 3A:
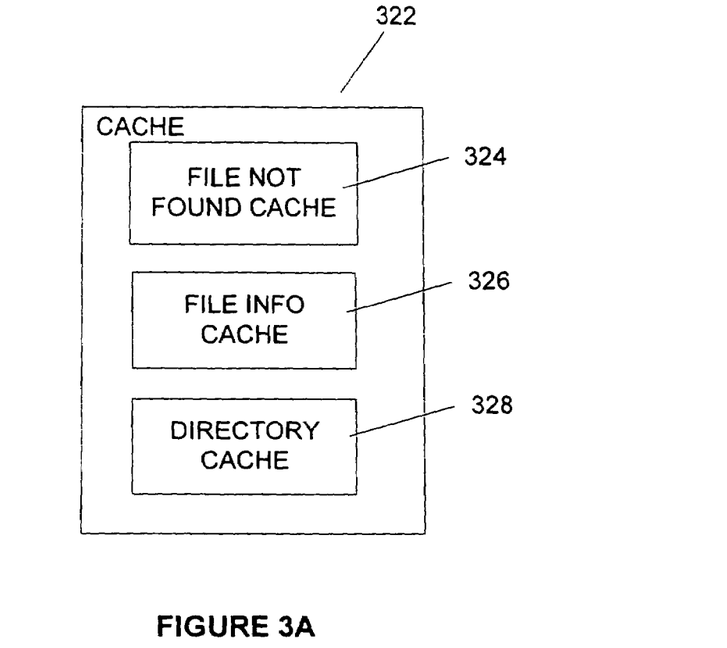
FIG. 3A is a schematic illustration of a general cache structure, including a directory cache usable in an embodiment of the invention.

The directory cache 228 is an expirable cache used to cache information regarding a directory on the server, in a manner to be described in greater detail below. As will be discussed, the FileNotFound cache 324 and the FileInfo cache 326 will typically be searched by the redirector 220 before the directory cache 328 is searched when the information sought is of the type that would ordinarily be cached in those caches. The directory cache 328 preferably contains, while valid, a wholly or partially valid enumeration of the target directory, such as via the commonly used BDI enumeration (Both Directory Enumeration, which comprises per-file information of type Basic Attributes, Standard Attributes, File Name, Short-File Name, File Index etc.) as defined by WINDOWS TOOLS produced by MICROSOFT CORPORATION of Redmond, Wash.

The function MRXSMB 224 (also referred to as the "Directory Tail Function") is used to interpret a directory query response (enumeration of files in the target directory in SMB protocol format, including information for '.' i.e., self and '..', i.e., parent) to the client 210 from the server 214, as will be discussed in greater detail hereinafter. Those of skill in the art will be familiar with the manner in which to use the MRXSMB function 224.

Figure 6:
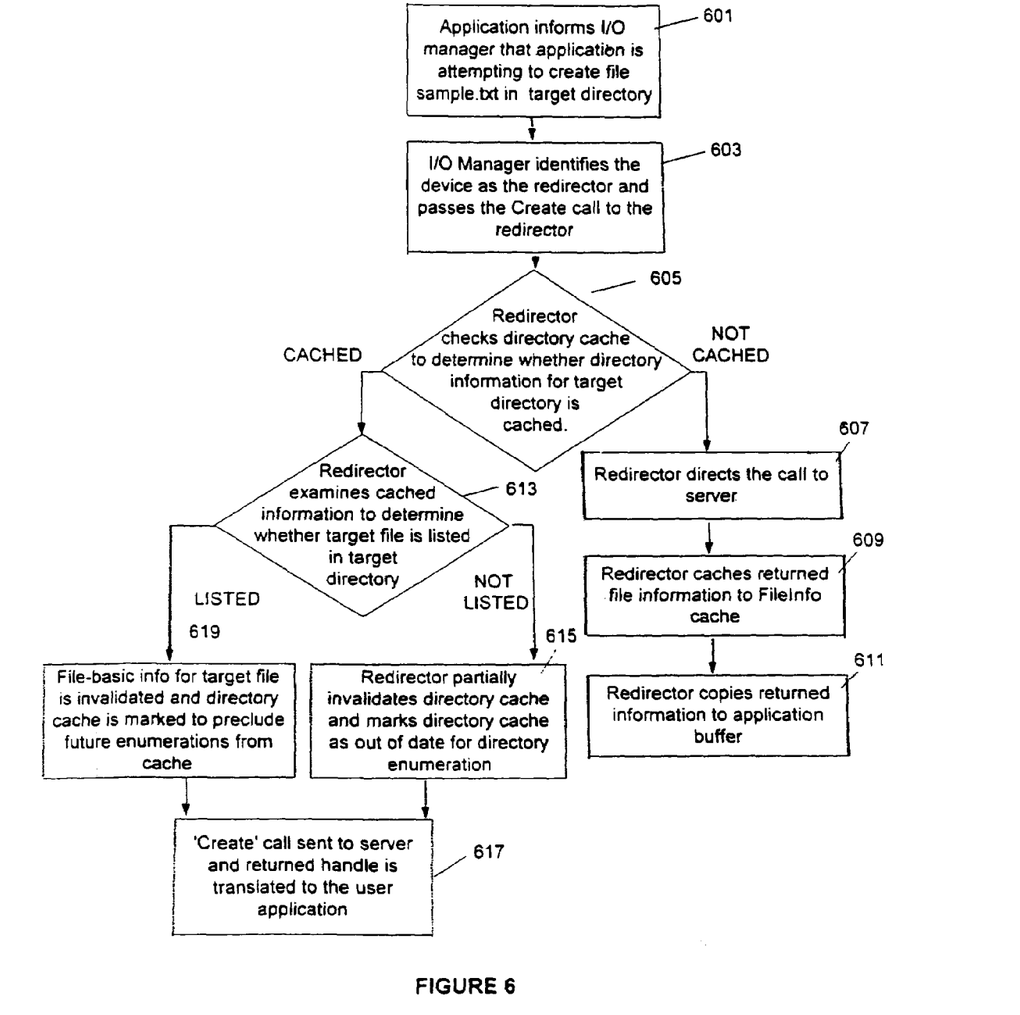
FIG. 6 is a flow chart illustrating the usage of a directory cache in an embodiment of the invention during a non-benign file access attempt.

The use of the directory cache 328 will now be described in greater detail with reference to the flow charts of FIGS. 4 and 6-7. In overview, the directory cache 328, is opportunistic and can be used positively and negatively under certain circumstances with respect to information about specific files, and can also be used more generally for purposes of directory enumeration under certain circumstances.

Figure 4:
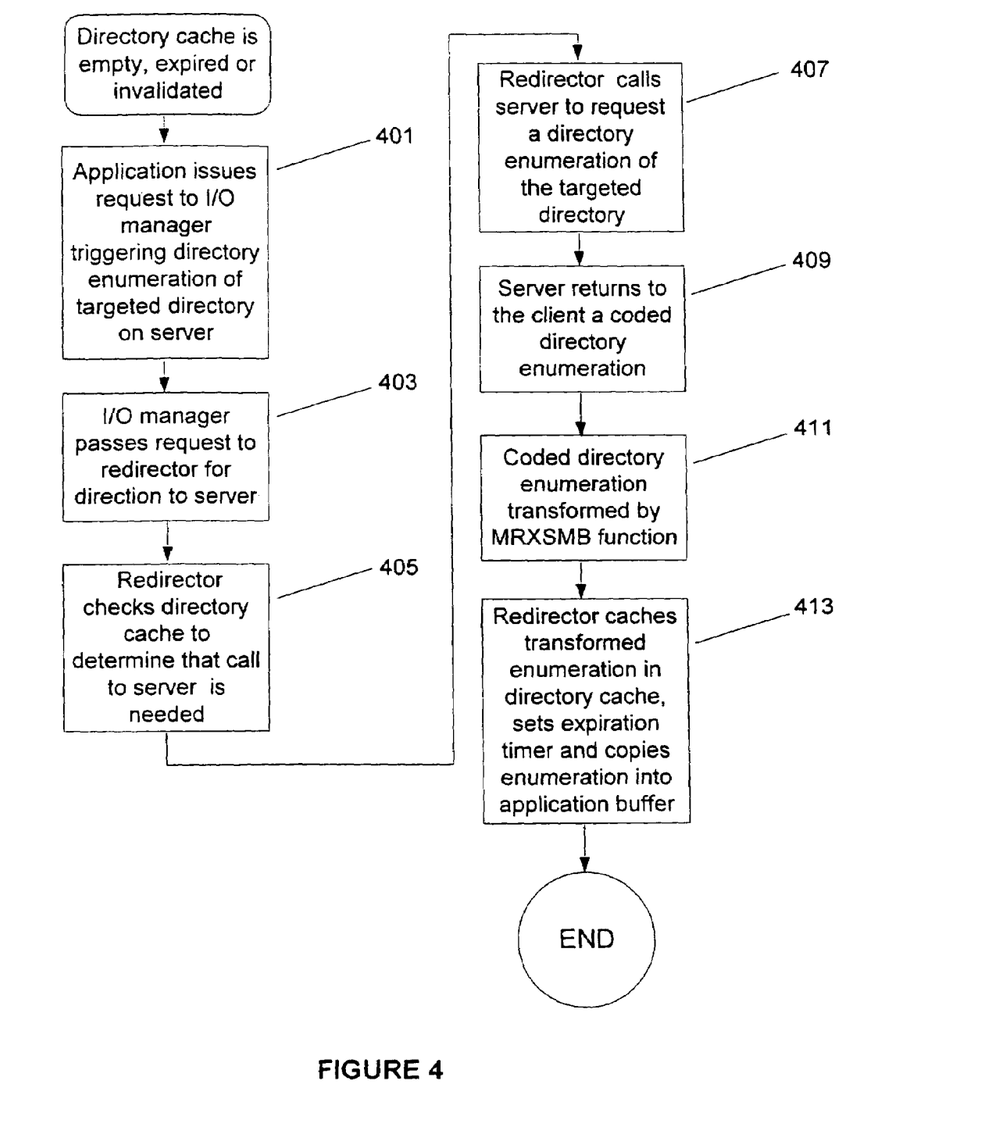
FIG. 4 is a flow chart showing a process flow for establishing the directory cache contents in an embodiment of the invention.

FIG. 4 illustrates in flow chart form one process for the initial establishment of the contents of the opportunistic directory cache 328. The process assumes that as an initial state the directory cache 328 is empty, expired or invalidated. In step 401, the application 212 issues a request to the I/O manager 218 that would typically trigger a directory enumeration of a targeted directory resident on the server 214. Such a request may be an explicit enumeration request such as a DIR or FindFirst request, or may be a request that implicitly requires an enumeration. The I/O manager 218, having received the request, passes the request to the redirector 220 in step 403 for direction to the appropriate information source, in this case the server 214. At step 405, the redirector 220 checks the directory cache 328 to determine if a call to the server 214 is needed. Since in this initial case there is no information in the directory cache 328, the redirector 220 calls the server 214 at step 407 to request a directory enumeration of the targeted directory.

At step 409, the server 214 returns to the client 210 a coded directory enumeration. The coded directory enumeration is transformed by the directory tail function 224 in step 411 into an enumeration that is usable by the directory cache 328 and the requesting application 212. The enumeration typically contains all files and folders visible at the top level. Finally at step 413, the redirector 220 caches the directory enumeration in the directory cache 328, sets a directory cache expiration timer to an appropriate value such as 10 seconds, and copies the enumeration into the application buffer. The directory cache expiration time may be an amount of time other than 10 seconds, and can also be user-settable. For the requested information, the application 212 then refers to the information stored in its application buffer. Note that the directory cache 328 need not be empty, expired or wholly invalidated in order to be refreshed. For example, if a directory enumeration from the server 214 becomes available for any reason, the cache may be refreshed.

Figure 3B:
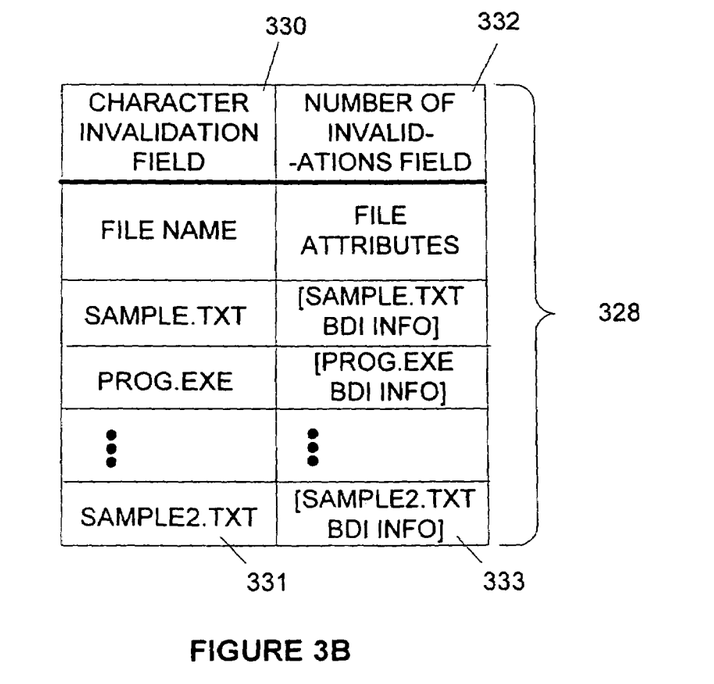
FIG. 3B is a schematic illustration of a directory cache structure and contents usable in an embodiment of the invention.

The general format of the information in the directory cache 328 at this point can be represented in the manner shown in FIG. 3b. In particular, the cached information associates each of one or more file names 331 with related file attributes 333. The file attributes can be a union of several levels of file attributes, such as basic, standard, etc. Basic attributes may be such attributes as file creation time, file last modified time, read only status, etc., as will be appreciated by those of skill in the art. Standard attributes can be such attributes as file size, name length, etc., as will be appreciated by those of skill in the art. Although not shown in FIG. 3B, directory cache 328 can also include a security descriptor identifying, or usable to identify, a user.

In one embodiment of the invention, it is assumed that the server 214 does not support short names, hard links etc. In other words, it is preferred that the server supports unique names with respect to files for the partition on which the redirector 220 is active. This is because many of the techniques that can be implemented using the opportunistic directory cache system are name-based and file addressability by unique names is required.

In overview, there are several specific types of behavior that can be implemented with respect to the directory cache. During open/create operations, where prior systems would have triggered multiple directory queries, the directory cache 328 is used to service most such queries, even in many cases when the cache 328 is partially invalidated. This behavior as well as other aspects of various embodiments of the invention will be described in greater detail hereinafter.

If the application 212 or another application on client 210 later makes a request that would ordinarily trigger another directory enumeration of the same target directory, the redirector 220 will serve the request from the directory cache 328 rather than call the server 214, if the directory cache is still valid for enumeration. This particular manner of usage of the directory cache 328 is referred to herein as the enumeration use of the directory cache 328. There are a number of situations, in addition to expiration, that could make the directory cache 328 partially invalid or "out of date for enumeration." Several such situations will be discussed in greater detail below in the context of specific examples. The directory cache 328 is opportunistic in that the redirector 220 serves most directory queries from the cache 328 while it remains valid for enumeration, and creation or deletion of files in the relevant directory serves only to partially invalidate the cache 328, although the directory cache 328 will be marked "out of date for enumeration."

As mentioned above, the directory cache 328 can be used in both a positive sense and a negative sense with respect to particular files and their associated information. For example, after the process described by the flow chart of FIG. 4 is completed, the directory cache 328 will remain wholly or partially valid until either expiration or express invalidation of the whole, or until it is replenished. The partial invalidation of the directory cache 328 is significant to some embodiments, and thus will be discussed before proceeding to a discussion of specific usage scenarios.

The primary motivation behind the partial invalidation scheme lies in the fact that the directory cache may be difficult to update in a piecemeal way. This can stem from any number of causes, but with respect to the MICROSOFT WINDOWS platform, the difficulty in updating is primarily due to the modular nature of the directory response path. In particular, the directory enumeration response is translated by the function MRXSMB 224 into a single body of directory information. Further compounding this problem, there are typically insufficient memory resources to precisely track the changes in existing directory information (such as when a file is modified, changing its time stamp) or to precisely track new directory information (such as when a file is newly created after caching of directory information) in the directory cache 328.

Thus the basic process of partial directory cache invalidation entails that when a change occurs that would have the effect of changing file attribute information such as BDI information or timestamp information, the directory cache 328 is not expressly updated or wholly invalidated. Rather, if the relevant file is listed in the directory cache 328, that particular entry is marked as invalid for serving file information, such as BDI information. The reason for this is that all queries with respect to this file are sent to the server 214 if the directory cache 328 confirms that the file exists on the server 214.

However, if the directory cache 328 does not list the relevant file, then the redirector 220 might ordinarily behave as if the file did not exist, even though it is known that a file was created etc. In order to resolve this dilemma, when a file is acted upon in a non-benign way that changes its time stamp or BDI information, and when that file is not listed in the directory cache 328, the BDI information of the first character projection of the changed file is marked invalid in the directory cache 328. For example, if the file BDES1.PRN was newly created after caching of directory information, then the attributes of all directory cache entries 331 listing files whose names begin with "B" (i.e. having a name of B*) are marked as invalid for serving file information. Nevertheless, each such entry can be used to confirm the existence of the particular file on the server 214 in the relevant partition. If a file that is the target of a non-benign operation is listed in the directory cache 328, the query is sent to the server 214 itself, the BDI information of the relevant file is invalidated in the directory cache 328, and any available updated file information from the server 214 is cached in the FileInfo cache 326. Also, the directory cache 328 is flagged as invalid for directory enumeration.

Similarly, for example, an application may attempt a delete operation on a file that is listed in the directory cache 328. In this case, the BDI information for the deleted file is invalidated in the directory cache 328 and the directory cache 328 as a whole is flagged as out of date for enumeration, i.e. for providing directory information regarding the target directory as a whole, such as an enumeration of the directory contents. In addition, the FileNotFound cache 324 is updated to indicate that the target file has been deleted, and any information in the FileInfo cache 326 regarding the target file is deleted. Because the various caches are expirable, a situation may arise where after the aforementioned actions, an application attempts to access a deleted file. If the FileNotFound cache 324 has expired, and the directory cache 328 has not, then the redirector will see the deleted file listed in the directory cache 328 as existent, and will forward the access call to the server itself. At this point, the server 214 will return the information that the file is not found, and the FileNotFound cache 324 will be refreshed.

For benign operations, such as "Open for read access" or "Open for read attributes," that would not change a target file's time stamp or BDI information, if the file name does not appear in the directory cache 328, the corresponding open/create is failed with a status of STATUS_OBJECT_NOT_FOUND. The directory cache 328 is not partially invalidated in this case.

With respect to the whole or partial invalidation of the directory cache 328, the cache 328 supports two status fields 330, 332 as shown in FIG. 3b. The first field 330, termed the first character invalidation field, indicates the characters for which first character projections are invalidated. Thus, the field 330 would list "a" if all files named "a*" are invalidated, and so on. The second field 332, termed the number invalidated field, stores the number of character invalidations, for the reason that if more than a predetermined number of first character projection invalidations are made before the cache 328 expires, then the directory cache 328 has become essentially useless and should be wholly invalidated. For example, if the number invalidated field 332 indicated that 10 first character projection invalidations have been made, the directory cache 328 may be wholly invalidated. Note that even when the directory cache 328 is only partially invalidated, it can no longer be used to accurately provide a directory enumeration.

In an embodiment, the directory cache 328 also supports fields for indicating other types of partial invalidation. For example, certain symbols are not generally considered to be "characters" but may nonetheless be the first entity in a file name. A first entity projection is invalidated as appropriate in such cases instead of a first character projection. As used hereinafter, the term "first character projection" will be understood to subsume within it's meaning such a first entity projection.

Particular directory cache use scenarios will now be discussed in greater detail. Referring to the flow chart of FIG. 6, the use of the directory cache 328 during a non-benign file access operation is illustrated. At step 601, the application 212 informs the I/O manager 218 that the application 212 is attempting to create a file sample.txt in a particular target directory. The Application may attempt to create the file with "Fail if exists, else fail-create the file", meaning, 'if the file already exists in the server, fail the request, else try creating the file on the server, and if for some reason the creation fails (due to disk space or some other constraint), inform the application, otherwise the application will wait to receive a handle.' In this case, the mini-rdr only translates the call to the remote system (i.e., the server) and does not parse the semantics of the call.

Since all operations on the client 210 are handle-based, the I/O manager 218 may require the creation of a handle to a file-object before any operation is issued on that file. At step 603, the I/O Manager identifies the device as the redirector and passes the Create call to the redirector.

At step 605, the redirector 220 strips off the directory name and checks to see if there is a cache on that name. If there is not, the redirector 220 directs the call to the server 214 itself in step 607, caches the returned file information to the FileInfo cache 326 in step 609, and copies the returned information to the application buffer of application 212 at step 611.

If there is, the redirector invalidates the directory cache in steps 613-619. This invalidation follows the procedures explained above. Thus, if the target file is determined at step 613 to exist in the target directory, then at step 619 the file-basic info for that particular file is invalidated and the cache is marked to avoid future enumerations. If at step 613 it is instead determined that the file is not listed in the cache as existing in the target directory, then in step 615, the first-character projection is invalidated and the cache is marked to avoid future enumerations. In both cases, the 'create' call is sent to the server in step 617 and the returned handle is translated to the user.

Figure 7:
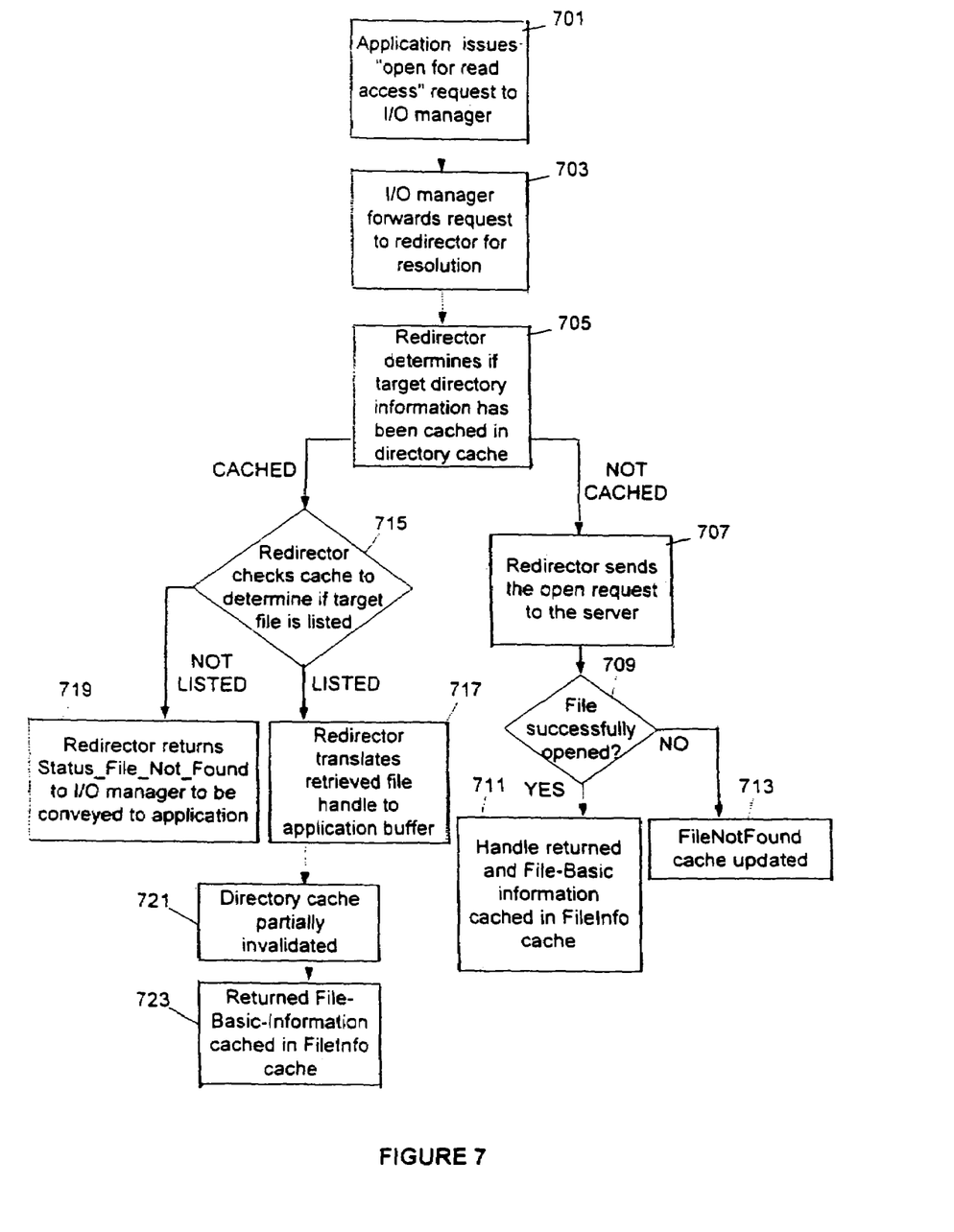
FIG. 7 is a flow chart illustrating the usage of a directory cache in an embodiment of the invention during a benign file access attempt.

FIG. 7 illustrates a potential sequence of events using the directory cache 328 in a situation where a benign file operation is being attempted. At step 701, the application 212 issues an "open for read access" request to the I/O manager 218 with respect to the file sample2.txt resident in a target directory. At step 703, the I/O manager 218 forwards the request to the redirector 220 for resolution. The redirector 220 determines at step 705 whether directory information for the target directory has been cached in the directory cache 328. If it is determined at step 705 that directory information for the target directory has not been cached, then at step 707, the redirector sends the open request to the server 214. At step 709, it is determined whether the file is successfully opened, and if so the handle is returned and the File-Basic information for that file is cached in the FileInfo cache 326 in step 711. If instead the file is not found on the server, then that information is cached in the FileNotFound cache 324 in step 713.

If at step 705 it is determined that information for the relevant directory has been cached, then if the cached directory information is determined in step 715 not to list the file sample2.txt, the redirector sends a STATUS_OBJECT_NOT_FOUND indication to the I/O manager 218 in step 719 and updates the FileNotFound cache 324. If instead the cached information does list the relevant file, the redirector sends an "open for read access" to the server 214.in step 717 and translates the retrieved file handle to the application buffer for application 212. The context that is received by the redirector from the server is typically a 16-bit unique USHORT that acts as an identifier of the relevant file across the SMB session. The redirector translates this handle to a filehandle, file-control-block, or other complete view of the file from the point of view of the I/O Manager. At step 721, the directory cache 328 is partially invalidated with respect to the particular file and at step 723, the returned File-Basic-Information is cached in the FileInfo cache 326.

In an alternative embodiment, the invention is implemented much as described above, except that the directory cache is maintained on a terminal server or other intermediate node serving multiple clients rather than on the client machines themselves. This architecture is shown schematically in FIG. 5. Note that this architecture includes many of the elements found in the previously discussed architectures, including I/O Manager 518, Redirector 520, cache 522, and MRXSMB 524. The client sessions 501, 503, 505 are part of the Terminal Server architecture. The actual terminal client 507, 509, 511 that runs on a client machine performs simple communication and graphics rendering tasks, while the process of interest is actually run on the terminal server 513.

Figure 3C:
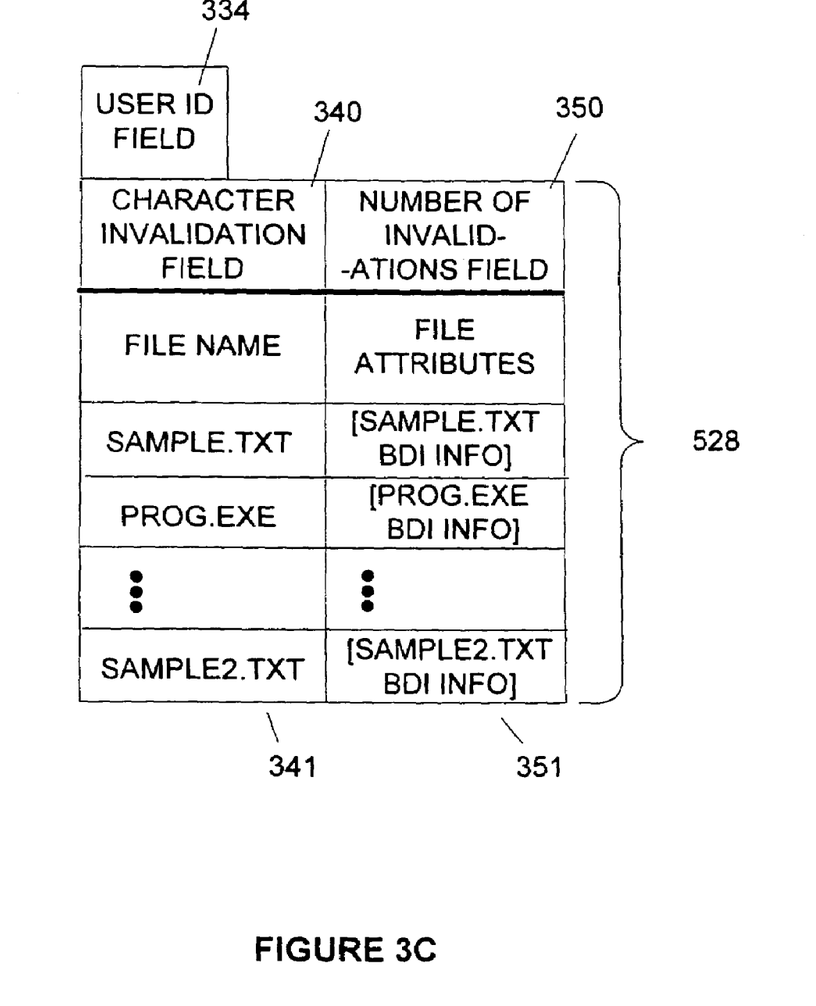
FIG. 3C is a schematic illustration of a directory cache structure and contents usable in an alternative embodiment of the invention.
Figure 5:
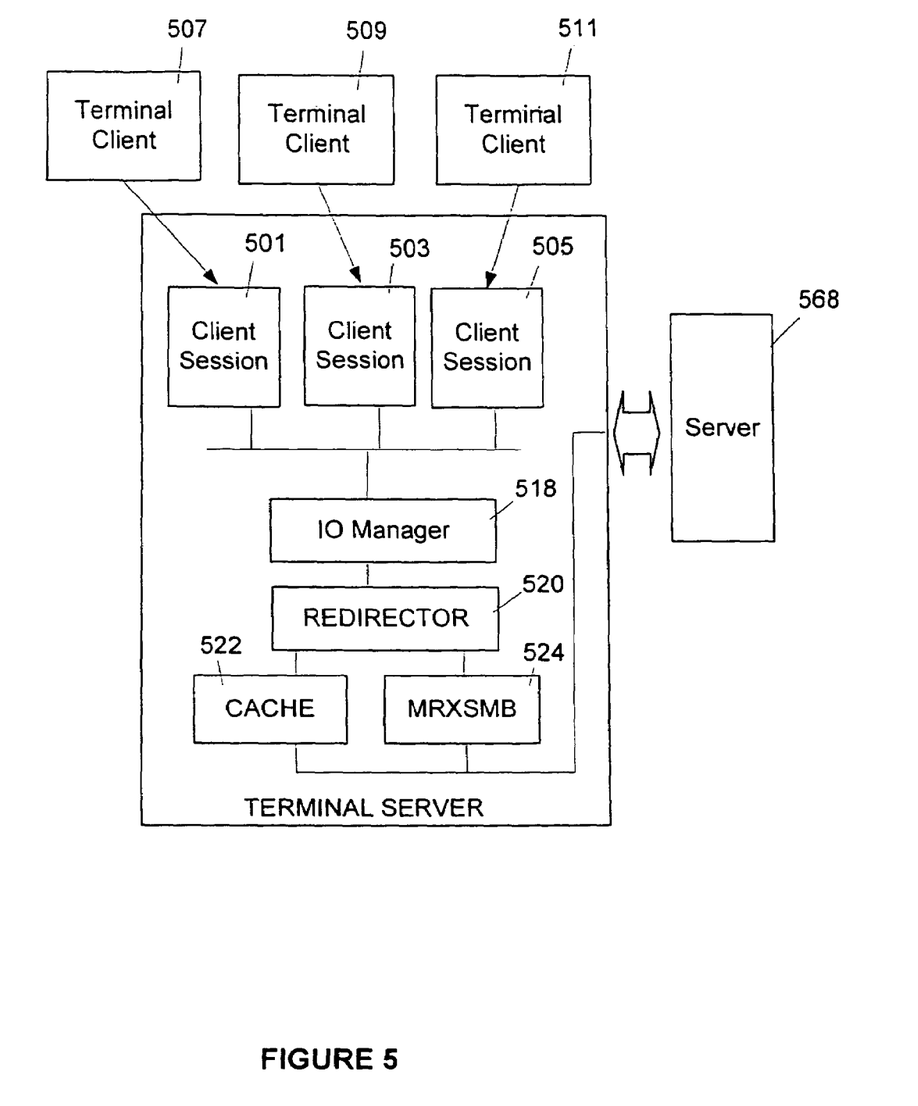
FIG. 5 is a schematic diagram showing the architecture of a network computing system within which an alternative embodiment of the invention can be implemented.

In the case of terminal services, since multiple client sessions 501, 503, 505 can exist over the redirector 520 there is a need for the cache owner to be identified. To this end, a Security descriptor (SID) identifying the user is implemented as part of each directory cache within cache 522. In particular, in the terminal server case, the user ID field 334 contained in the directory cache 328 is used to identify the user for whom the directory is cached, so that a particular directory cache can be used to serve a particular client session 501, 503, 505. This is especially important when different clients can have varying scopes of permitted access in the server 568. Note that directory cache 328 still contains the other features discussed above such as a character projections invalidated field 340 and a number invalidated field 350, as well as file name 341 and attribute 351 fields for the same reasons as discussed above.

In addition to the invalidation scenarios discussed above, the directory cache 328 for a particular user is entirely invalidated if a different user issues a create, enum, or other query to the target directory or files within. This is due to the inability of the redirector 520 to make sure that the querying user has at least the same privileges on the directory as the user for which the directory enumeration was cached. Such access checking is typically performed at the server only.

Because the level of directory access and file modification will likely be extensive in a multi-user scenario such as illustrated in FIG. 5, a directory cache within cache 522 may often contain an excessive number of invalidated character projections, as indicated by field 350, and as such may become largely ineffectual. For this reason, it will sometimes be desirable to turn off or disable the terminal server-based directory cache functionality in such an environment. Preferably a user or administrator is able to disable the terminal server-based directory cache 528. Note that the directory cache 328 in the client-based directory cache embodiment preferably can be turned off as well by the user. It is also preferable, but not necessary, that the expiration time and other meaningful directory cache properties be user-settable in each embodiment.

All of the references cited herein, including patents, patent applications, and publications, are hereby incorporated in their entireties by reference.

In view of the many possible embodiments to which the principles of this invention may be applied, it should be recognized that the embodiments described herein with respect to the drawing figures are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Furthermore, although network connections are illustrated herein as lines, no limitation should thereby be imparted to the invention to the invention. Network connections may be circuit-switched, packet-switched, otherwise, and may be transient or permanent, hard-wired or wireless, operating via any suitable protocol. Therefore, the invention as described herein contemplates all such embodiments as may come within the scope of the following claims and equivalents thereof.

We claim:

1. A computer system comprising a processor for executing computer executable code, a memory for storing computer executable code and an input/output device, the processor being programmed to execute computer executable code for caching, in a directory cache, information regarding files contained in a target directory, the computer executable code comprising code for:

caching a name field wherein the name field comprises a plurality of names of a plurality of files;

caching an attribute field associated with the name field wherein the attribute field comprises file information associated with each of the plurality of files;

caching a character invalidation field wherein the character invalidation field comprises an indication that file information is invalid, wherein the file information is associated with one or more of the plurality of files and includes one or more file names starting with a selected character, and the indication comprises a first character projection of the invalid file that includes the name starting with the selected character;

caching a number invalidated field wherein the number invalidation field comprises an indication of the number of selected characters;

caching a security descriptor field wherein the security descriptor field comprises a data for identifying a user; and wholly invalidating the directory cache if the number invalidated field includes more than a predetermined number of the selected characters.

2. The computer system according to claim 1, wherein the existence in the name field of a file name starting with a character indicted in the character invalidation comprises an indication that the file associated with that file name exists on the target directory.

3. The computer system according to claim 1, wherein the cache expires at the completion of an expiration period.

4. The computer system according to claim 3, wherein the expiration period is user-settable.

5. The computer system according to claim 1, wherein the cache is dissoluble at the indication of a user.

6. The computer system according to claim 1, further comprising a user ID field identifying a client computer user for whom the cache is maintained.

7. The computer system according to claim 6, wherein the cache can be disabled by the client computer user.

8. The computer system according to claim 6, wherein the cache can be disabled by a network administrator.

9. The computer system according to claim 6, wherein the cache is maintained on a machine other than a machine being used by the client computer user.

10. A computer storage medium including computer executable code for caching information regarding files contained in a target directory, the code executed on a processing unit and comprising:
- a first module for caching in a name field, a plurality of names of a plurality of files;
- a second module for caching in an attribute field associated with the name field, file information associated with each of the plurality of files;
- a third module for storing in a character invalidation field, an indication that the file information is invalid, wherein the file information is associated with a file of the plurality of files, the file comprising a name that starts with a selected character, wherein the indication stored in the character invalidation field corresponds to a first character projection of the invalid file that includes the name starting with the selected character;
- a fourth module for storing in a number invalidated field, an indication of the number of selected characters; and
- a fifth module for wholly invalidating the directory cache before the directory cache expires if more than a predetermined number of first character projection invalidations are cached in the character invalidation field as determined by the indication of the number of selected characters stored in the number invalidated field.

* * * * *